United States Patent [19]

Verhelst et al.

[11] 4,374,938

[45] Feb. 22, 1983

[54] PROCESS FOR THE DEGRADATION OF POLYMERS

[75] Inventors: Willem F. Verhelst, Gorssel; Ulfert E. Wiersum, Velp, both of Netherlands

[73] Assignee: Akzona Incorporated, Asheville, N.C.

[21] Appl. No.: 236,343

[22] Filed: Feb. 20, 1981

[30] Foreign Application Priority Data

Feb. 29, 1980 [NL] Netherlands .......................... 8001231

[51] Int. Cl.$^3$ ............................................... C08K 5/32
[52] U.S. Cl. ...................................... 523/124; 525/377
[58] Field of Search ...................... 525/377; 260/96 D; 523/124, 125, 127

[56] References Cited

U.S. PATENT DOCUMENTS 3,503,906  3/1970  Brack .................................... 525/377
3,706,715 12/1972  Brack .................................... 525/377
3,804,798  4/1974  Cantor ................................... 525/377

FOREIGN PATENT DOCUMENTS 49-16259  4/1974  Japan ..................................... 525/377
1146469   3/1969  United Kingdom ................. 525/377

OTHER PUBLICATIONS

Alkylation of Benzohydroxamic Acid; Johnson et al; Jour. Org. Chem. 36 (2): pp. 284–294, (1971).

*Primary Examiner*—Paul R. Michl
*Attorney, Agent, or Firm*—Francis W. Young; Daniel N. Christus

[57] ABSTRACT

This disclosure relates to a process for the degradation of polymers in the presence of a free radical initiator. In particular this disclosure relates to a process for the degradation of polymers employing a free radical initiator selected from a class of hydroximic acid derivatives.

18 Claims, No Drawings

PROCESS FOR THE DEGRADATION OF POLYMERS

The present invention relates to a process for the degradation of polymers in the presence of a free radical initiator. It is well known to one of ordinary skill in the art that polymers obtained according to the Ziegler-Natta process, such as polypropylene, may be degraded not only thermally and/or oxidatively, but also by the action of radical-forming compounds. However, polymers prepared by way of the Ziegler-Natta system have unduly high molecular weight and consequently too high a viscosity to be readily processed into fibres, films, granules and other shaped articles. Degradation results in the molecular weight and the viscosity being reduced and in a narrowing of the molecular weight distribution. British patent specification Nos. 1,407,356 and 1,422,681 describes the use of radical-forming compounds, in particular organic peroxides, with or without particular stabilizers for the degradation of polymers.

The process of the present invention relates to an improved method for degradating polymers, the improvement comprises employing as a free radical an initiator compound of the formula:

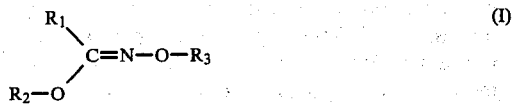

wherein
- $R_1$ is selected from the class consisting of substituted or unsubstituted: $C_1$–$C_{22}$ alkyl, $C_2$–$C_{22}$ alkenyl, $C_6$–$C_{20}$ cyclohexyl, $C_6$–$C_{20}$ and $C_7$–$C_{20}$ aralkyl;
- $R_2$ is selected from the class consisting of substituted or unsubstituted: $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl, $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenoxycarbonyl and $C_8$–$C_{21}$ aralkyloxycarbonyl; and
- $R_3$ is hydrogen, a group selected from the class consisting of substituted or unsubstituted: $C_1$–$C_{20}$ alkyl, $C_2$–$C_{20}$ alkenyl, $C_6$–$C_{20}$ cyclohexyl, $C_6$–$C_{20}$, phenyl, $C_7$–$C_{20}$ aralkyl, $C_2$–$C_{21}$ alkylcarbonyl, $C_3$–$C_{21}$ alkenylcarbonyl $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl and $C_8$–$C_{21}$ aralkyloxycarbonyl; a

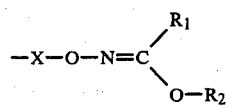

group wherein X is substituted or unsubstituted: $C_1$–$C_{12}$ alkylene, $C_2$–$C_{12}$ alkenylene, $C_6$–$C_{12}$ cycloalkylene or phenylene; or a

group wherein Y is substituted or unsubstituted: $C_1$–$C_{20}$ alkyl, $C_6$–$C_{20}$ cycloalkyl or phenyl.

The "alkyl" and "alkenyl" radicals referred to above include primary, secondary, as well as tertiary alkyl and alkenyl groups. In addition, the groups represented by $R_1$, $R_2$, $R_3$, X and Y may be substituted at one or more positions. Suitable substituents include, for example, alkyl, cyclohexyl, phenyl, phenyloxy, aralkyl, aralkyloxy, carboxyl, amino, nitro, or halogen groups. If a halogen group is employed as a substituent, chlorine is preferred.

Some of the initiators employed in the process of the present invention are described in German Pat. No. 2,705,034. Also, a number of these compounds are disclosed in Annalen 281, 169 (1894); American Chemical Journal 20, 1 (1898); American Chemical Journal 33, 60 (1905); Berichte 24, 3447 (1891); Australian Journal of Chemistry 22, 161 (1969); Journal of Organic Chemistry 36 (2), 284 (1971); Journal of Organic Chemistry 37, 3520 (1972), and Journal of the Chemical Society 1080 (1977). The above references fail to suggest that the described compounds can be employed as initiators.

Degradation may be carried out in accordance with known techniques and procedures, for example as described in the above-mentioned British Patent Specifications. Polymers that may be employed in the process of the present invention include polymers prepared by the Ziegler-Natta process, in particular polypropylene and copolymers of propylene. Polypropylene is preferably employed in the process of the present invention. The polymer may be stabilized in accordance with known procedures with, for example, antioxidants and light protective agents. The hydroximic acid derivatives of formula (I) are then generally mixed with such a stabilized polymer, followed by degradation. The radical-forming compounds of formula (I) are generally employed in an amount equal to 0.001–0.5 parts by weight per 100 parts by weight of polymer. Degradation may be carried out in any conventional mixer, in which the polymer is heated to above the melt temperature. Suitable mixers include a melt extruder, a screw injection moulding machine or a kneader. Degradation with the aid of the hydroximic acid derivatives of formula (I) is generally carried out within a temperature range of from 170°–350° C., and preferably from 220°–300° C. The duration of the treatment is dependent on the degree of degradation desired. Generally, the treatment will last between 1 and 30 minutes. When compared with conventional peroxides, such as 2,5-di-t-butylperoxy-2,5-methyl hexane, employed for the degradation of polymers the compounds of formula (I) permit the degree of degradation to be far more satisfactorily controlled.

Although the specific reaction mechanism according to which the process of the present invention proceeds is not generally known, it is plausible to assume that, upon thermal decomposition, the initiators, at least partly disintegrate into three fragments, in particular a nitrile compound ($R_1$-C≡N) and two radicals ($R_2O$ and $R_3O$). This disintegration produces the same radicals which are formed as a result of the decomposition of an organic peroxide of the formula: $R_2$—O—O—$R_3$. The organic peroxides of this formula are referred to hereinafter as peroxides "corresponding" to the hydroximic acid derivatives. It has been found that the decomposition temperatures of hydroximic acid derivatives employed in the process of the present invention are 40°–120° C. higher than that of the "corresponding"

organic peroxides. Consequently, the hydroximic acid derivatives are in general safer than the "corresponding" peroxides. This higher decomposition temperature is advantageous in a number of applications, especially those applications wherein an increase in reaction temperature and/or maximum permissible processing temperature leads to a lower viscosity and better processability of the reaction mass.

It should be noted that as with conventional peroxides, the practical utility of a hydroximic acid derivative in initiating radical reactions is not only governed by the type of radicals produced but also by the rate at which they are produced at a particular reaction temperature. There is, of course, no point in applying hydroximic acid derivatives at a temperature at which for practical purposes too few radicals are formed at a particular reaction temperature.

The following hydroximic acid derivatives have been found to be particularly effective initiators in degradation reactions. In addition, mixtures of such hydroximic acid derivatives may also be employed in the process of the present invention. The hydroximic acid derivatives are listed below in different classifications. The limitations for $R_1$, $R_2$, X and Y in each classification correspond to the known limitations for the corresponding peroxides classified as such.

The first class includes hydroximic acid derivatives, wherein $R_1$ is above defined, $R_2$ is substituted or unsubstituted: $C_1-C_{20}$ alkyl, $C_2-C_{20}$ alkenyl, cyclohexyl or $C_7-C_{20}$ aralkyl, and $R_3$ is hydrogen. Compounds representative of this class include ethyl dodecane hydroximate, allyl acetohydroximate, cyclohexyl benzohydroximate and cumyl benzohydroximate. The peroxides "corresponding" to this class of hydroximic acid derivatives are commonly referred to as hydroperoxides.

A second class of compounds includes hydroximic acid derivatives wherein $R_1$ is above defined and $R_2$ and $R_3$ are independently substituted or unsubstituted: $C_1-C_{20}$ alkyl, cyclohexyl or $C_7-C_{20}$ aralkyl. Compounds representative of this class include ethyl-O-ethyl benzohydroximate, tertiary butyl-O-ethyl dodecanehydroxymate, cumyl-O-methyl acetohydroximate and tertiary butyl-O-tertiary butylbenzohydroximate. The peroxides "corresponding" to this class of hydroximic acid derivatives are commonly referred to as dialkyl peroxides.

A third class of compounds includes hydroximic acid derivatives wherein $R_1$ is above defined and $R_2$ and $R_3$ are independently substituted or unsubstituted: $C_7-C_{21}$ phenylcarbonyl. Compounds representative of this class include benzoic-O-benzoyl benzohydroximic anhydride, and trimethylaceto-O-benzoyl benzohydroximic anhydride. The peroxides "corresponding" to this class of hydroximic acid derivatives are referred to as diacyl peroxides.

A fourth class includes hydroximic acid derivatives wherein $R_1$ is above defined, $R_2$ is selected from the group consisting of substituted or unsubstituted: $C_1-C_{20}$ alkyl, $C_2-C_{20}$ alkenyl, cyclohexyl, phenyl and $C_7-C_{20}$ aralkyl; and $R_3$ is selected from the group consisting of substituted or unsubstituted: $C_2-C_{21}$ alkoxycarbonyl, $C_3-C_{21}$ alkenyloxycarbonyl, $C_7-C_{21}$ cyclohexyloxycarbonyl, $C_7-C_{21}$ phenyloxycarbonyl and $C_8-C_{21}$ aralkyloxycarbonyl. Compounds representative of this class include ethyl-O-(isopropyloxycarbonyl)-dodecanehydroximate, and propyl-O-(cyclohexyloxycarbonyl)-benzohydroximate. The peroxides "corresponding" to this class of hydroximic acid derivatives are referred to as peroxycarbonates.

A fifth class of particularly effective initiators includes hydroximic acid derivatives wherein $R_1$ is above defined and $R_2$ and $R_3$ are selected from the groups represented by $R_4$ and $R_5$, wherein $R_4$ is selected from the class consisting of substituted or unsubstituted: $C_1-C_{20}$ alkyl, $C_2-C_{20}$ alkenyl, cyclohexyl, phenyl and $C_7-C_{20}$ aralkyl and $R_5$ is selected from the class consisting of substituted or unsubstituted: $C_2-C_{21}$ alkylcarbonyl, $C_3-C_{21}$ alkenylcarbonyl, $C_7-C_{21}$ cyclohexylcarbonyl, $C_6-C_{21}$ phenylcarbonyl and $C_8-C_{21}$ aralkyl; provided that if $R_2$ is a group represented by $R_4$, then $R_3$ is a group represented by $R_5$ and if $R_2$ is a group represented by $R_5$, then $R_3$ is a group represented by $R_4$. Compounds representative of this class include tertiary butyl-O-pivaloyl dodecanehydroximate, ethyl-O-phenoxyacetyl dodecanehydroximate, ethyl-O-methacryloyl dodecanehydroximate, tertiary butyl-O-ethylhexanoyl benzohydroximate, tertiary butyl-O-benzoyl acetohydroximate, and tertiary butyl-O-benzoyl benzohydroximate. The peroxides "corresponding" to this class of hydroximic acid derivatives are referred to as peresters. The preferred initiators of this fifth class comprise hydroximic acid derivatives wherein $R_1$ is $C_2-C_{20}$ alkyl, $R_2$ is $C_1-C_5$ alkyl, and $R_3$ is $C_7-C_{21}$ phenylcarbonyl. Compounds representative of this preferred class include ethyl-O-benzoyl propiohydroximate, ethyl-O-benzoyl dodecanehydroximate, methyl-O-2,4-dichlorobenzoyl pivalohydroximate and tertiary butyl-O-benzoyl n-butyrohydroximate. Ethyl-O-benzoyl dodecane hydroximate in displaying very good activity and efficiency in radical reactions, is most preferred. In addition the dodecane nitrile formed in reactions employing ethyl-O-benzoyl dodecane hydroximate contains little or no toxicity.

The compounds of the present invention may be prepared from the corresponding imidates. The imidates may be prepared employing known procedures.

A nitrile of the formula: $R_1-C\equiv N$, wherein $R_1$ is above defined; is treated with an alcohol in the presence of an acid such as hydrochloric acid. A salt is produced and the reaction mixture is then treated with an aqueous solution of an alkali carbonate and an organic solvent in which the imidate is soluble, such as, for example, ether. The phases are separated and the organic phase is dried and then evaporated to yield an imidate of the formula:

(II)

The imidate of formula (II) is heated with a hydroxylamine salt, such as hydroxylammonium chloride or hydroxylammonium sulfate. The reaction is carried out in the presence of an organic solvent, such as ether, benzene, toluene, hexane or dichloromethane. The reaction is generally proceeds with stirring and within a temperature range of 0°–40° C. Upon completion of the reaction, the organic phase is separated from the aqueous phase and is then dried employing drying agents such as sodium sulfate and magnesium sulfate. The organic solvent is subsequently evaporated to yield an hydroximate of the formula:

$$\begin{array}{c} R_1 \\ \phantom{R_2-O}\diagdown \\ \phantom{R_2-O}C=N-OH \\ \phantom{R_2-O}\diagup \\ R_2-O \end{array} \quad (III)$$

Other hydroximic acid derivatives are obtained by allowing the hydroximate of formula (III) to react with a compound of the formula $R_3$-Cl, provided that $R_3$ is not hydrogen. This reaction is carried out in an organic solvent, such as ether, benzene, toluene, hexane, or dichloromethane. The reaction proceeds in the presence of a base, such as, for example, pyridine, sodium bicarbonate and potassium carbonate. In general, the reaction is carried out with stirring and within a temperature range of from 0°–40° C. A salt which formed is removed by filtration and the organic solvent is evaporated to yield a compound of formula (I).

The following examples further illustrate the present invention. Examples 1–3 describe the preparation of the initiators employed in the procedures described in Example 4.

EXAMPLE 1

In a 3-necked flask equipped with stirrer, thermometer and dropping funnel a mixture containing 12.5 g of ethyldodecanehydroximate and 4.0 g of pyridine dissolved in 60 ml of ether was cooled to 2° C. To the resulting solution was slowly added a solution containing 7.1 g of benzoyl chloride in 10 ml of ether. The reaction mixture was stirred for 5 hours at 20° C. and then filtered to remove, pyridine hydrochloride salt, a white precipitate. The ether solution was concentrated to yield 17.0 g (100% yield) of ethyl-O-benzoyl dodecanehydroximate as a liquid. The structure was confirmed by IR and NMR analyses.

EXAMPLE 2

To 100 ml of absolute ethanol in a three-necked flask of 250 ml, equipped with stirrer, thermometer and cooler, was slowly added 4.6 g of sodium metal in portions, at 20° C. After a solution was obtained, 14.5 g of ethyl benzohydroximate and 15.6 g of ethyl iodide were sequentially added. The reaction mixture was heated to 60° C. and then stirred for 2 hours. The reaction mixture was cooled and then 65 ml of water, 50 ml of ether and 50 ml of petroleum ether were added to the mixture. The layers were separated and the organic layer was dried over potassium carbonate and concentrated at 20° C. to yield 9.8 g (65% yield) of ethyl-o-ethyl benzohyroximate as a light yellow liquid. The structure of the compound was confirmed by IR and NMR analyses.

EXAMPLE 3

To 50.2 g of O-benzoyl benzohydroximic acid sodium salt, and 550 ml of diethylether in a three-necked 1 liter flask, equipped with stirrer, thermometer, cooler and dropping funnel, was added a solution containing 25.3 g of benzoyl chloride in 50 ml of diethylether, over a period of 15 min. at a temperature of 20° C. The reaction mixture was then stirred for 30 hours at room temperature. The mixture was filtered and the filtrate evaporated under reduced pressure, to produce a residue containing 44.2 g of a solid crude product. The crude product was purified by adding with 100 ml of pentane at 0° C. The resulting solution was filtered to yield a solid substance which was dried and then crystallized from benzene to yield 34.2 g (55% yield) of benzoic-O-benzoyl benzohydroximic anhydride. The structure was confirmed by IR and NMR analyses.

EXAMPLE 4

In a breaker 50 g polypropylene powder was mixed with 0.05 g of a hydroximic acid derivative prepared in Examples 1–3. The mixtures were added to the chamber of a Haake Rheocord fitted with a chamber Rheomix type 500 containing Z-blades. The rotor speed was 64 r.p.m. The chamber was then heated electrically to a temperature of 280° C. The torque versus time was recorded. To demonstrate the effect of the hydroximic acid derivatives of formula (I), experiments were carried out without any additive and one with 2,5-di-t-butylperoxy-2,5-dimethyl hexane as the degradant. The results are summarized in Table I. The results in Table I are the mean values for 5 separate experiments.

TABLE I

| Initiator | Torque in Nm after x minutes degradation | | | | | | | | | |
|---|---|---|---|---|---|---|---|---|---|---|
| | 3 | 6 | 9 | 12 | 15 | 18 | 21 | 24 | 27 | 30 |
| None* | 0.582 | 0.401 | 0.327 | 0.281 | 0.253 | 0.232 | 0.210 | 0.193 | 0.177 | 0.164 |
| ethyl-O—benzoyl dodecanehydroximate | 0.195 | 0.150 | 0.130 | 0.118 | 0.112 | 0.105 | 0.100 | 0.096 | 0.093 | 0.090 |
| ethyl-O—ethyl benzohydroximate | 0.573 | 0.320 | 0.283 | 0.144 | 0.111 | 0.095 | 0.083 | 0.074 | 0.071 | 0.066 |
| benzoic-O—benzoyl benzohydroximic anhydride | 0.284 | 0.161 | 0.140 | 0.125 | 0.119 | 0.111 | 0.103 | 0.099 | 0.097 | 0.095 |
| 2,5-di-t.butylperoxy 2,5-dimethyl hexane | 0.130 | 0.097 | 0.085 | 0.078 | 0.074 | 0.070 | 0.068 | 0.066 | 0.064 | 0.063 |

*mean values out of 5 experiments

The above results show that the hydroximic acid derivatives of formula (I) are suitable degrading agents. Moreover, it has been found that the degree of degradation is more satisfactorily controlled when a hydroximic acid derivative of formula (I) is employed than when 2,5-di-t-butylperoxy-2,5-dimethyl hexane is employed.

We claim:

1. In an improved process for degradation of polymers, the improvement comprises employing as a free radical initiator a compound of the formula

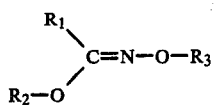

$$\begin{array}{c} R_1 \\ \phantom{R_2-O}\diagdown \\ \phantom{R_2-O}C=N-O-R_3 \\ \phantom{R_2-O}\diagup \\ R_2-O \end{array}$$

wherein $R_1$ is selected from the class consisting of substituted or unsubstituted: $C_1$–$C_{22}$ alkyl, $C_2$–$C_{22}$ alkenyl, $C_6$–$C_{20}$ cyclohexyl, $C_6$–$C_{20}$, phenyl, and $C_7$–$C_{20}$ aralkyl;

$R_2$ is selected from the class consisting of substituted or unsubstituted: $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl, $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenoxycarbonyl and $C_8$–$C_{21}$ aralkyloxycarbonyl; and $R_3$ is hydrogen, a group selected from the class consisting of substituted or unsubstituted: $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl and $C_8$–$C_{21}$ aralkyloxycarbonyl; a

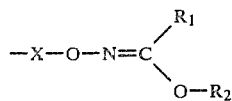

group wherein X is substituted or unsubstituted: $C_1$–$C_{12}$ alkylene, $C_2$–$C_{12}$ alkenylene, $C_6$–$C_{12}$ cycloalkylene or phenylene; or a

group wherein Y is substituted or unsubstituted: $C_1$–$C_{20}$ alkyl, $C_6$–$C_{20}$ cycloalkyl or phenyl.

2. A process according to claim 1, wherein $R_1$ is selected from the class consisting of $C_1$–$C_{22}$ alkyl, $C_2$–$C_{22}$ alkenyl, $C_6$–$C_{20}$ cyclohexyl, $C_6$–$C_{20}$ phenyl and $C_7$–$C_{20}$ aralkyl;

$R_2$ is selected from the class consisting of $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl, $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenoxycarbonyl and $C_8$–$C_{21}$ aralkyloxycarbonyl; and $R_3$ is hydrogen, a group selected from the class consisting of $C_1$–$C_{20}$ alkyl, $C_2$–$C_{20}$ alkenyl, $C_6$–$C_{20}$ cyclohexyl, $C_6$–$C_{20}$ phenyl, $C_7$–$C_{20}$ aralkyl, $C_2$–$C_{21}$ alkylcarbonyl, $C_3$–$C_{21}$ alkenylcarbonyl $C_7$–$C_{21}$ cyclohexylcarbonyl, $C_7$–$C_{21}$ phenylcarbonyl, $C_8$–$C_{21}$ aralkylcarbonyl, $C_7$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl and $C_8$–$C_{21}$ aralkyloxycarbonyl; a

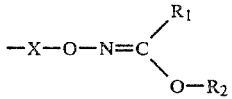

group wherein X is $C_1$–$C_{12}$ alkylene, $C_2$–$C_{12}$ alkenylene, $C_6$–$C_{12}$ cycloalkylene or phenylene; or a

group wherein Y is $C_1$–$C_{20}$ alkyl, $C_6$–$C_{20}$ cycloalkyl or phenyl.

3. A process according to claim 2, wherein $R_2$ is $C_1$–$C_{20}$ alkyl, $C_2$–$C_{20}$ alkenyl, cyclohexyl or $C_7$–$C_{20}$ aralkyl, and $R_3$ is hydrogen.

4. A process according to claim 2, wherein $R_2$ and $R_3$ are independently $C_1$–$C_{20}$ alkyl, cyclohexyl or $C_7$–$C_{20}$ aralkyl.

5. A process according to claim 2, wherein $R_2$ and $R_3$ are independently $C_7$–$C_{21}$ phenylcarbonyl.

6. A process according to claim 2, wherein $R_2$ is $C_1$–$C_{20}$ alkyl, $C_2$–$C_{20}$ alkenyl, cyclohexyl, phenyl or $C_7$–$C_{20}$ aralkyl, and $R_3$ is $C_2$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl or $C_8$–$C_{21}$ aralkyloxycarbonyl.

7. A process according to claim 2, wherein $R_2$ and $R_3$ are selected from the class represented by $R_4$ and $R_5$, wherein $R_4$ is selected from the class consisting of $C_1$–$C_{20}$ alkyl, $C_2$–$C_{20}$ alkenyl, cyclohexyl, phenyl and $C_7$–$C_{20}$ aralkyl and $R_5$ is selected from the class consisting of $C_2$–$C_{21}$ alkylcarbonyl, $C_3$–$C_{21}$ alkenylcarbonyl, $C_7$–$C_{21}$ cyclohexylcarbonyl, $C_6$–$C_{21}$ phenylcarbonyl and $C_8$–$C_{21}$ aralkyl; provided that if $R_2$ is a group represented by $R_4$, then $R_3$ is a group represented by $R_5$ and if $R_2$ is a group represented by $R_5$, then $R_3$ is a group represented by $R_4$.

8. A process according to claim 7, wherein $R_1$ is $C_2$–$C_{20}$ alkyl, $R_2$ is $C_1$–$C_5$ alkyl and $R_3$ is $C_7$–$C_{21}$ phenylcarbonyl.

9. A process according to claim 8, wherein the initiator is ethyl-O-benzoyl dodecanehydroximate.

10. A process according to claim 1, wherein $R_2$ is substituted: $C_1$–$C_{20}$ alkyl, $C_2$–$C_{20}$ alkenyl, cyclohexyl or $C_7$–$C_{20}$ aralkyl, and $R_3$ is hydrogen.

11. A process according to claim 1, wherein $R_2$ and $R_3$ are independently substituted: $C_1$–$C_{20}$ alkyl, cyclohexyl or $C_7$–$C_{20}$ aralkyl.

12. A process according to claim 1, wherein $R_2$ and $R_3$ are independently substituted $C_7$–$C_{21}$ phenylcarbonyl.

13. A process according to claim 1, wherein $R_2$ is substituted: $C_1$–$C_{20}$ alkenyl, cyclohexyl, phenyl or $C_7$–$C_{20}$ aralkyl, and $R_3$ is substituted: $C_2$–$C_{21}$ alkoxycarbonyl, $C_3$–$C_{21}$ alkenyloxycarbonyl, $C_7$–$C_{21}$ cyclohexyloxycarbonyl, $C_7$–$C_{21}$ phenyloxycarbonyl or $C_8$–$C_{21}$ aralkyloxycarbonyl.

14. A process according to claim 1, wherein $R_2$ and $R_3$ are selected from the class represented by $R_4$ and $R_5$, wherein $R_4$ is selected from the class consisting of substituted: $C_1$–$C_{20}$ alkyl, $C_2$–$C_{20}$ alkenyl, cyclohexyl, phenyl and $C_7$–$C_{20}$ aralkyl and $R_5$ is selected from the class consisting of substituted: $C_2$–$C_{21}$ alkylcarbonyl, $C_3$–$C_{21}$ alkenylcarbonyl, $C_7$–$C_{21}$ cyclohexylcarbonyl, $C_6$–$C_{21}$ phenylcarbonyl and $C_8$–$C_{21}$ aralkyl; provided that if $R_2$ is a group represented by $R_4$, then $R_3$ is a group represented by $R_5$ and if $R_2$ is a group represented by $R_5$, then $R_3$ is a group represented by $R_4$.

15. A process according to claim 1, wherein $R_1$ is $C_2$–$C_{20}$ alkyl, $R_2$ is $C_1$–$C_5$ alkyl and $R_3$ is a substituted $C_7$–$C_{21}$ phenylcarbonyl.

16. A process according to claim 1, wherein the substituted $R_1$, $R_2$, $R_3$, X or Y groups contain substituents selected from the class consisting of alkyl, cyclohexyl, phenyl, phenyloxy, aralkyl, aralkyloxy, carboxyl, amino, nitro and halo.

17. In an improved process for degradation of polypropylene the improvement comprises employing as a free radical initiator a compound of claim 1.

18. In an improved process for the degradation of polypropylene, the improvement comprising employing as a free radical initiator a compound of the formula $$\begin{array}{c} R_1 \\ \phantom{R_2}\diagdown \\ \phantom{R_2O}C{=}N{-}O{-}R_3, \\ \phantom{R}\diagup \\ O \\ \diagup \\ R_2 \end{array}$$

wherein
$R_1$ is selected from the class consisting of $C_2$–$C_{20}$ alkyl and $C_6$–$C_{20}$ phenyl; and
$R_2$ and $R_3$ are independently selected from the class consisting of $C_2$–$C_{20}$ alkyl and $C_7$–$C_{21}$ phenylcarbonyl.

* * * * *